(12) United States Patent
Xu

(10) Patent No.: US 12,177,866 B2
(45) Date of Patent: Dec. 24, 2024

(54) USER EQUIPMENT AND METHOD OF WIRELESS COMMUNICATION

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 373 days.

(21) Appl. No.: 17/748,013

(22) Filed: May 18, 2022

(65) Prior Publication Data
US 2022/0279568 A1 Sep. 1, 2022

Related U.S. Application Data

(63) Continuation of application No. PCT/CN2020/130151, filed on Nov. 19, 2020.

(60) Provisional application No. 62/937,513, filed on Nov. 19, 2019.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
None
See application file for complete search history.

(56) References Cited

U.S. PATENT DOCUMENTS

| | | | |
|---|---|---|---|
| 2019/0149365 A1 | 5/2019 | Chatterjee et al. | |
| 2019/0159213 A1 | 5/2019 | Baldemair et al. | |
| 2020/0162208 A1* | 5/2020 | Moon | H04W 72/0446 |
| 2020/0162216 A1* | 5/2020 | Yang | H04L 5/0048 |
| 2021/0022158 A1* | 1/2021 | Wei | H04L 5/0044 |

(Continued)

FOREIGN PATENT DOCUMENTS

| | | |
|---|---|---|
| CN | 103841588 | 6/2014 |
| CN | 108282879 | 7/2018 |
| WO | 2019192530 | 10/2019 |

OTHER PUBLICATIONS

Office Action of India Counterpart Application, Application No. 202227034431, issued on Sep. 30, 2022, pp. 1-6.
(Continued)

*Primary Examiner* — Otis L Thompson, Jr.
(74) *Attorney, Agent, or Firm* — JCIP GLOBAL INC.

(57) ABSTRACT

An apparatus and a method of wireless communication are provided. The method by a user equipment (UE) includes deriving, by the UE, a transmission scheme indication, wherein the transmission scheme indication is used to indicate a time domain resource allocation (TDRA) table configured with a transmission scheme, and determining, by the UE, the TDRA table in accordance with the transmission scheme indication. This can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

12 Claims, 2 Drawing Sheets

Note: this case requires S+L>14.

(56) References Cited

U.S. PATENT DOCUMENTS

2021/0051669 A1* 2/2021 Lin .................... H04W 72/53
2021/0143869 A1* 5/2021 Khoshnevisan .......... H04L 1/08
2021/0314982 A1* 10/2021 Panteleev ............. H04L 5/0053

OTHER PUBLICATIONS

Search Report of Counterpart Europe application No. 20890943.2, issued on Nov. 21, 2022, p. 1-p. 9.

ZTE, "PUSCH enhancements for NR URLLC", 3GPP TSG RAN WG1 #99 R1-1911965, Nov. 9, 2019, pp. 1-10.

Ericsson., "PUSCH Enhancements for NR URLLC", 3GPP TSG RAN WG1 Meeting #99 R1-1911947, Nov. 9, 2019, pp. 1-15.

MCC Support., "Final Report of 3GPP TSG RAN WG1 #98bis v2.0.0", 3GPP TSG RAN WG1 Meeting #99 R1-1913275, Nov. 18-22, 2019, pp. 1-160.

"International Search Report (Form PCT/ISA/210) of PCT/CN2020/130151," mailed on Feb. 3, 2021, pp. 1-4.

"Written Opinion of the International Searching Authority (Form PCT/ISA/237) of PCT/CN2020/130151," mailed on Feb. 3, 2021, pp. 1-5.

"Office Action of China Counterpart Application, Application No. 202210671329.5", with English translation thereof, issued on Dec. 4, 2023, p. 1-p. 12.

"Office Action of Europe Counterpart Application, Application No. 20890943.2", issued on Mar. 22, 2023, p. 1-p. 6.

"Office Action of China Counterpart Application, Application No. 202210671329.5", with English translation thereof, Issued on Jul. 30, 2023, p. 1-p. 16.

"Office Action of Europe Counterpart Application, Application No. 20890943.2", issued on Sep. 6, 2023, p. 1-p. 6.

\* cited by examiner

Note: this case requires S+L>14.

USER EQUIPMENT AND METHOD OF WIRELESS COMMUNICATION

CROSS-REFERENCE TO RELATED APPLICATION

This application is a continuation of international application of PCT application serial no. PCT/CN2020/130151, filed on Nov. 19, 2020, which claims the priority benefit of U.S. provisional application Ser. No. 62/937,513, filed on Nov. 19, 2019. The entirety of each of the above mentioned patent applications is hereby incorporated by reference herein and made a part of this specification.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. A wireless multiple-access communications system may include a number of base stations or network access nodes, each simultaneously supporting communication for multiple communication devices, which may be otherwise known as user equipments (UEs). A wireless communication network may include a base station that can support communication for a UE. The UE may communicate with the base station via downlink and uplink. The downlink refers to a communication link from the base station to the UE, and the uplink refers to a communication link from the UE to the base station.

In wireless communications, physical uplink shared channel (PUSCH) transmissions can be: dynamically scheduled by an uplink grant in a downlink control information (DCI), this is referred to as a dynamic grant; semi-statically configured and scheduled by higher layer parameters without detection of an uplink grant in a DCI, this is referred to as a type 1 configured grant (CG); or semi-statically configured by higher layer parameters and semi-persistently scheduled by an uplink grant in a DCI, this is referred to as a type 2 CG. How to determine or configure a time domain resource assignment (TDRA) table and/or is a number of repetitions is still an open issue.

Therefore, there is a need for an apparatus (such as a user equipment (UE)) and a method of wireless communication, which can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

SUMMARY

An object of the present disclosure is to propose an apparatus (such as a user equipment (UE)) and a method of wireless communication, which can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

In a first aspect of the present disclosure, a method of wireless communication by a user equipment (UE), comprising deriving, by the UE, a transmission scheme indication, wherein the transmission scheme indication is used to indicate a time domain resource allocation (TDRA) table configured with a transmission scheme, and determining, by the UE, the TDRA table in accordance with the transmission scheme indication.

In a second aspect of the present disclosure, a method of wireless communication by a user equipment (UE) comprising determining, by the UE, if a first parameter is configured in a time domain resource allocation (TDRA) table; if yes, the UE uses the first parameter to determine a number of physical uplink shared channel (PUSCH) repetitions; if not, the UE derives a second parameter to determine the number of PUSCH repetitions.

In a third aspect of the present disclosure, a user equipment (UE) comprises a memory, a transceiver, and a processor coupled to the memory and the transceiver. The processor is configured to derive a transmission scheme indication, and the transmission scheme indication is used to indicate a time domain resource allocation (TDRA) table configured with a transmission scheme. The processor is configured to determine the TDRA table in accordance with the transmission scheme indication.

In a fourth aspect of the present disclosure, a user equipment (UE) comprises a memory, a transceiver, and a processor coupled to the memory and the transceiver. The processor is configured to determine if a first parameter is configured in a time domain resource allocation (TDRA) table; if yes, the processor uses the first parameter to determine a number of physical uplink shared channel (PUSCH) repetitions; if not, the processor derives a second parameter to determine the number of PUSCH repetitions.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
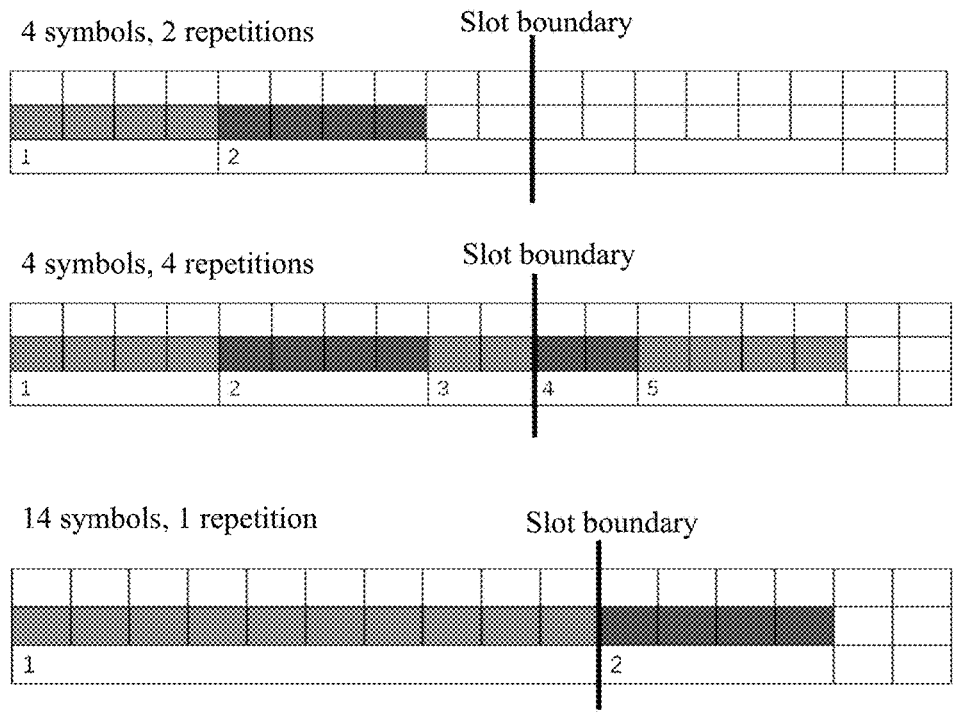
FIG. 1 is a schematic diagram illustrating examples of option 4 for physical uplink shared channel (PUSCH) enhancements.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments, two hybrid automatic repeat request acknowledgement (HARQ-ACK) codebooks, power control for inter-user equipment (UE) multiplexing, and/or a physical uplink shared channel (PUSCH) repetition enhancement has been discussed for dynamic transmission. Configured grant (CG) transmission includes a type 1 CG transmission and a type2 CG transmission. For type 1 CG transmission, all parameters are configured by a radio resource control (RRC). For type 2 CG transmission, partial parameters are configured by an RRC, partial parameters are indicated by a downlink control information (DCI), which is used for a type 2 CG activation. The RRC related parameters are configured by ConfiguredGrantConfig information element, as illustrated in a table 1.

TABLE 1

ConfiguredGrantConfig information element

-- ASN1 START
-- TAG-CONFIGUREDGRANTCONFIG-START
ConfiguredGrantConfig ::=      SEQUENCE {
    frequencyHopping             ENUMERATED {intraSlot, interSlot}
        OPTIONAL,            -- Need S,
    cg-DMRS-Configuration        DMRS-UplinkConfig,
    mcs-Table                    ENUMERATED {qam256,
qam64LowSE}                                           OPTIONAL,    -- Need S
    mcs-TableTransformPrecoder   ENUMERATED {qam256,
qam64LowSE}                                           OPTIONAL,    -- Need S
    uci-OnPUSCH                          SetupRelease { CG-UCI-OnPUSCH }
OPTIONAL,        -- Need M
    resourceAllocation           ENUMERATED
{ resourceAllocationType0, resourceAllocationType1, dynamicSwitch },
    rbg-Size                     ENUMERATED {config2}
OPTIONAL,        -- Need S
    powerControlLoopToUse        ENUMERATED {n0, n1},
    p0-PUSCH-Alpha                         P0-PUSCH-AlphaSetId,
    transformPrecoder            ENUMERATED {enabled, disabled}
OPTIONAL,        -- Need S
    nrofHARQ-Processes           INTEGER(1..16),
    repK                          ENUMERATED {n1, n2, n4, n8},
    repK-RV                              ENUMERATED {s1-0231, s2-0303,
s3-0000}                          OPTIONAL,                 -- Need R
    periodicity                  ENUMERATED {
                                          sym2, sym7, sym1x14,
sym2x14, sym4x14, sym5x14, sym8x14, sym10x14, sym16x14, sym20x14,
                                                  sym32x14, sym40x14,
sym64x14, sym80x14, sym128x14, sym160x14, sym256x14, sym320x14, sym512x14,
                                                    sym640x14, sym 1024x14,
sym1280x14, sym2560x14, sym5120x14,
                                          sym6, sym1x12, sym2x12,
sym4x12, sym5x12, sym8x12, sym10x12, sym16x12, sym20x12, sym32x12,
                                                  sym40x12, sym64x12,
sym80x12, sym128x12, sym160x12, sym256x12, sym320x12, sym512x12, sym640x12,
                                                    sym1280x12, sym2560x12
    }, TABLE 1-continued ConfiguredGrantConfig information element

```
    configuredGrantTimer                    INTEGER (1..64)
OPTIONAL,         -- Need R
    rrc-ConfiguredUplinkGrant               SEQUENCE {
        timeDomainOffset                        INTEGER (0..5119),
        timeDomainAllocation                    INTEGER (0..15),
        frequencyDomainAllocation               BIT STRING (SIZE(18)),
        antennaPort                             INTEGER (0..31),
        dmrs-SeqInitialization                  INTEGER (0..1)
OPTIONAL,         -- Need R
        precodingAndNumberOfLayers              INTEGER (0..63),
        srs-ResourceIndicator                   INTEGER (0..15)
OPTIONAL,         -- Need R
        mcsAndTBS                               INTEGER (0..31),
        frequencyHoppingOffset                  INTEGER (1..
maxNrofPhysicalResourceBlocks-1)                OPTIONAL,    -- Need R
        pathlossReferenceIndex                  INTEGER (0..maxNrofPUSCH-
PathlossReferenceRSs-1),
        ...
    }
OPTIONAL,               -- Need R
    ...
    }
    CG-UCI-OnPUSCH ::= CHOICE {
        dynamic                                 SEQUENCE (SIZE (1..4)) OF
BetaOffsets,
        semiStatic                          BetaOffsets
    }
    -- TAG-CONFIGUREDGRANTCONFIG-STOP
-- ASN1STOP
```

In some embodiments, PUSCH repetition scheme includes two options: a release 16 (Rel-16) PUSCH transmission scheme and a release 15 (Rel-15) PUSCH transmission scheme. For Rel-16 PUSCH transmission scheme: Option 4. For Rel-15 PUSCH transmission scheme: the transmission is done according to Rel-15 behavior, either with or without slot aggregation. With slot aggregation, the number of repetitions can be either semi-statically configured (as in Rel-15) or dynamically indicated (as agreed for Rel-16).

Here is the description of Option 4 from TR 38.824: One or more actual PUSCH repetitions in one slot, or two or more actual PUSCH repetitions across slot boundary in consecutive available slots, is supported using one uplink (UL) grant for dynamic PUSCH, and one configured grant configuration for configured grant PUSCH. It further consists of:

1. The number of the repetitions signaled by gNB represents the "nominal" number of repetitions. The actual number of repetitions can be larger than the nominal number. FFS dynamically or semi-statically signalled for dynamic PUSCH and type 2 configured grant PUSCH.
2. The time domain resource assignment (TDRA) field in the DCI or the TDRA parameter in the type 1 configured grant indicates the resource for the first "nominal" repetition.
3. The time domain resources for the remaining repetitions are derived based at least on the resources for the first repetition and the UL/downlink (DL) direction of the symbols. For further study (FFS) the detailed interaction with the procedure of UL/DL direction determination.
4. If a "nominal" repetition goes across the slot boundary or DL/UL switching point, this "nominal" repetition is splitted into multiple PUSCH repetitions, with one PUSCH repetition in each UL period in a slot. Handling of the repetitions under some conditions, e.g., when the duration is too small due to splitting, is to be further investigated in the work item (WI) phase.
5. No demodulation reference signa (DMRS) sharing across multiple PUSCH repetitions.
6. The maximum transport block size (TBS) is not increased compared to Rel-15.
7. FFS: L>14.
8. S+L can be larger than 14.
9. FFS: The bitwidth for TDRA is up to 4 bits.
10. Note: different repetitions may have the same or different redundancy versions (RVs).

In a current discussion, a PUSCH transmission scheme configuration is also agreed. The agreements comprise the followings.

Agreements:

For DG and retransmission of configured grant (CG), introduce one RRC parameter for each of a DCI format 0_1 and a new uplink (UL) DCI format, to indicate whether UE follows the behavior for "Rel-16 PUSCH transmission scheme" or the behavior for "Rel-15 PUSCH transmission scheme".

FFS: whether to restrict that "Rel-16 PUSCH transmission scheme" cannot be enabled for both DCI formats simultaneously.

For Type 1 CG, introduce an RRC parameter per CG configuration to indicate whether a UE follows the behavior for "Rel-16 PUSCH transmission scheme" or the behavior for "Rel-15 PUSCH transmission scheme".

Agreements:

For Type 2 CG, UE uses the PUSCH transmission scheme ("Rel-16 PUSCH transmission scheme" or "Rel-15 PUSCH transmission scheme") associated with a activation DCI format.

In a current discussion, a repetition number indication procedure is also agreed. The agreements comprise the followings.

Agreements:

For a dynamic indication of the number of repetitions for dynamic grant:

Jointly coded with a start and length indication value (SLIV) in a TDRA table, by adding an additional column for the number of repetitions in the TDRA table. The maximum TDRA table size is increased to 64. No other specification impact is expected.

Agreements:

Support dynamic indication of the number of repetitions for Rel-15 PUSCH with slot aggregation using a DCI formats 0_1 and a new UL DCI format. The dynamic indication is done by using the same Rel-16 mechanism (jointly coding the number of repetitions with SLIV in TDRA table).

From above agreements, a PUSCH transmission scheme in some embodiments is configured for each DCI format independently. Further, a repetition number is determined by a TDRA table. Therefore, there is a need for a TDRA table configuration in a PUSCH transmission enhancement. For dynamic transmission and type 2 configured grant transmission, there is a DCI for scheduling and activation separately. Therefore, repetition number and the corresponding TDRA table can be configured by the DCI.

However, for type 1 configured grant, there is no DCI. How to determine or configure a TDRA table is an open issue. If a UE configures directly with the TDRA table for type 1 configured grant, an overhead for RRC signaling will increase greatly. The number of repetitions, which is indicated by the repK, configured in ConfiguredGrantConfig in Rel-15, is jointly coded with SLIV in TDRA. However, when both values are configured, how to determine number of repetitions is an open issue.

Therefore, some embodiments of the present disclosure provide an apparatus (such as a user equipment (UE)) and a method of wireless communication, which can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

FIG. 1 illustrates examples of option 4 for physical uplink shared channel (PUSCH) enhancements. These examples include an example of 4 symbols and 2 repetitions, an example of 4 symbols and 4 repetitions, and an example of 14 symbols and 1 repetition. In the example of 14 symbols and 1 repetition, S plus L is greater than 14. S may refer to a number of symbols, L may refer to a number of overall resources for one repetition, and a value of S may equal to a value of L.

Figure 2:
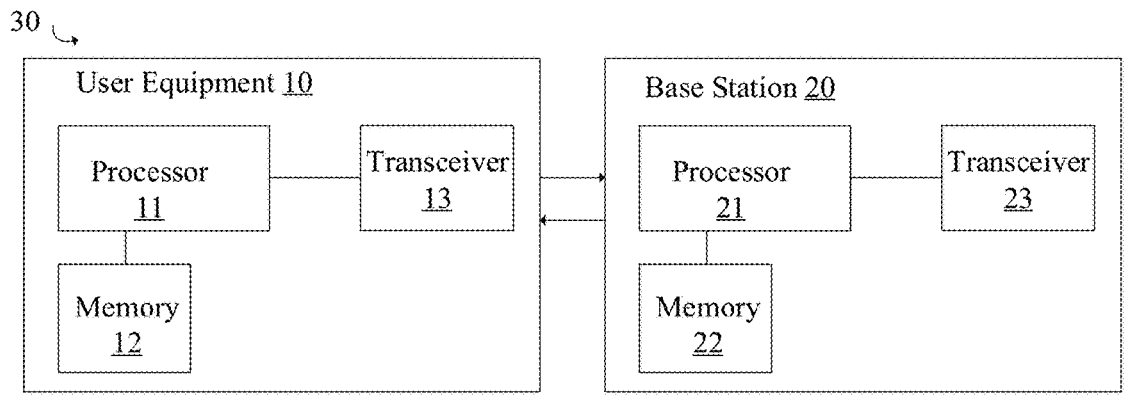
FIG. 2 is a block diagram of one or more user equipments (UEs) and a base station of wireless communication in a communication network system according to an embodiment of the present disclosure.

FIG. 2 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to derive a transmission scheme indication, and the transmission scheme indication is used to indicate a time domain resource allocation (TDRA) table configured with a transmission scheme. The processor 11 is configured to determine the TDRA table in accordance with the transmission scheme indication. This can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

In some embodiments, the processor 11 is configured to determine if a first parameter is configured in a time domain resource allocation (TDRA) table; if yes, the processor 11 uses the first parameter to determine a number of physical uplink shared channel (PUSCH) repetitions; if not, the processor 11 derives a second parameter to determine the number of PUSCH repetitions. This can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

Figure 3:
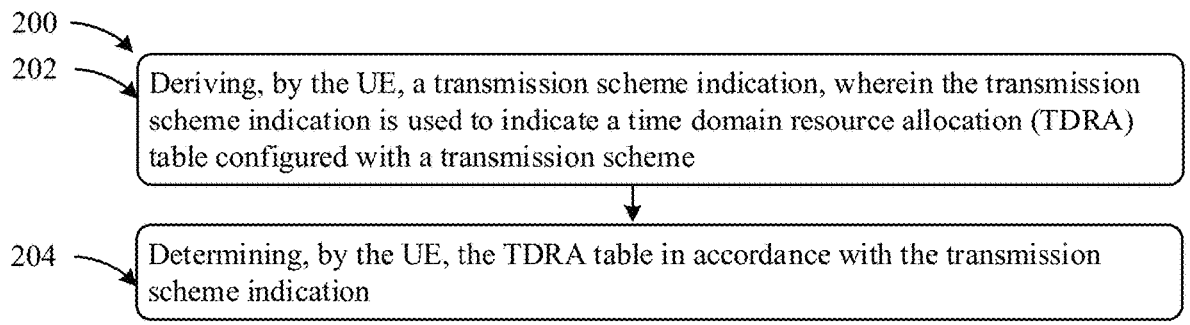
FIG. 3 is a flowchart illustrating a method of wireless communication performed by a user equipment (UE) according to an embodiment of the present disclosure.

FIG. 3 illustrates a method 200 of wireless communication by a user equipment (UE) according to an embodiment of the present disclosure. In some embodiments, the method 200 includes: a block 202, deriving, by the UE, a transmission scheme indication, wherein the transmission scheme indication is used to indicate a time domain resource allocation (TDRA) table configured with a transmission scheme, and a block 204, determining, by the UE, the TDRA table in accordance with the transmission scheme indication. This can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

Figure 4:
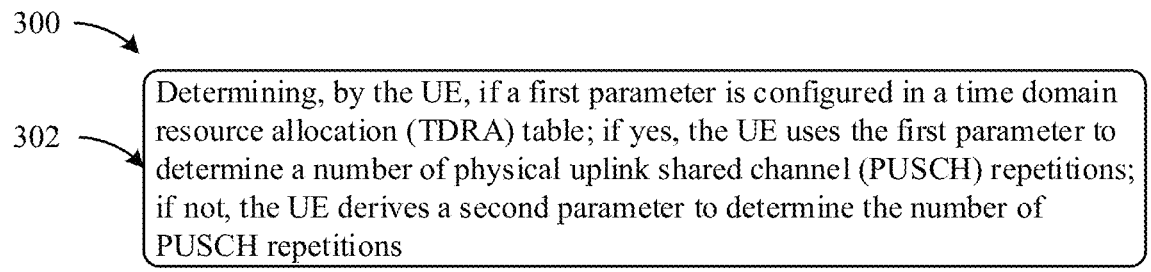
FIG. 4 is a flowchart illustrating a method of wireless communication performed by a user equipment (UE) according to an embodiment of the present disclosure.

FIG. 4 illustrates a method 300 of wireless communication by a user equipment (UE) according to an embodiment of the present disclosure. In some embodiments, the method 300 includes: a block 302, determining, by the UE, if a first parameter is configured in a time domain resource allocation (TDRA) table; if yes, the UE uses the first parameter to determine a number of physical uplink shared channel (PUSCH) repetitions; if not, the UE derives a second parameter to determine the number of PUSCH repetitions. This can solve issues in the prior art, enable a UE to determine a TDRA table without additional radio resource control (RRC) signaling overhead, make the TDRA table align with a transmission scheme, enable the UE to flexibly determine a number of repetitions, provide a good communication performance, and/or provide high reliability.

In some embodiments, the UE executes a physical uplink shared channel (PUSCH) transmission in accordance with the determined TDRA table. In some embodiments, the transmission scheme indication comprises a PUSCH transmission scheme indication, and the transmission scheme comprises a release 16 (Rel-16) PUSCH transmission scheme or a release 15 PUSCH transmission scheme. In some embodiments, the TDRA table corresponds to a target downlink control information (DCI) format configured with the Rel-16 PUSCH transmission scheme. In some embodiments, the target DCI format comprises a DCI format 0_1 or a DCI format 0_2. In some embodiments, only one of the DCI format 0_1 or the DCI format 0_2 is configured with the Rel-16 PUSCH transmission scheme. In some embodiments, the PUSCH transmission comprises an initial type 1 configured grant (CG) PUSCH transmission configured with the Rel-16 PUSCH transmission scheme, and the initial type 1 CG PUSCH transmission is not expected that none of the DCI format 0_1 and the DCI format 0_2 is configured with the Rel-16 PUSCH transmission scheme.

In some embodiments, the TDRA table corresponds to a TDRA table configuration for UE specific search space (USS) in Rel-15. In some embodiments, the TDRA table is configured in a parameter. In some embodiments, the parameter comprises PUSCH-Config. In some embodiments, the PUSCH transmission comprises an initial type 1 CG PUSCH transmission configured with the Rel-15 PUSCH transmission scheme, and the TDRA table is used for the USS in the Rel-15.

In some embodiments, the UE derives the second parameter via high signaling. In some embodiments, the first parameter comprises numberofrepetitions. In some embodiments, the second parameter comprises repK. In some embodiments, the UE performs repetitions according to the number of PUSCH repetitions. In some embodiments, the number of PUSCH repetitions is used for initial type 1 CG PUSCH transmission. In some embodiments, the TDRA table is associated with time domain resource allocation in the high signaling.

In some embodiments, the UE uses the first parameter to derive an activation DCI to determine the number of PUSCH repetitions, and the number of PUSCH repetitions is used for initial type 2 CG PUSCH transmission. In some embodiments, the TDRA table is associated with the activation DCI for the initial type 2 CG PUSCH transmission.

Some embodiments of the present disclosure provide technical solutions that enable a UE to determine a TDRA table without additional RRC signaling overhead for type 1 configured grant. Reusing a PUSCH transmission scheme indication to select the TDRA table also makes the TDRA table align with a PUSCH transmission scheme. The following are some exemplary embodiments consistent with the disclosed methods for enabling the UE to determine the TDRA table without additional RRC signaling overhead for type 1 configured grant.

Example (for Initial Type 1 CG PUSCH Transmission with Rel-16 PUSCH Transmission Scheme)

A UE derives a first PUSCH transmission scheme indication, wherein the first PUSCH transmission scheme indication is used to indicate with a TDRA table for Rel-16 PUSCH transmission scheme. The UE determines the TDRA table corresponding to a target DCI format that is configured with Rel-16 PUSCH transmission scheme. The UE executes the PUSCH transmission in accordance with the determined TDRA table. Optionally, the target DCI format comprises DCI format 0_1 and/or DCI format 0_2. Optionally, only one of DCI format 0_1 or DCI format 0_2 is configured with Rel-16 PUSCH transmission scheme. Optionally, for the initial Type 1 CG PUSCH transmission configured with Rel-16 PUSCH transmission scheme, it is not expected that none of the DCI formats 0_1 and 0_2 is configured with Rel-16 PUSCH transmission scheme. Optionally, the first PUSCH transmission scheme indication is used to indicate that a target DCI format is configured with Rel-16 PUSCH transmission scheme. Optionally, for the initial Type 1 CG PUSCH transmission with Rel-16 PUSCH transmission scheme, if at least one of DCI formats 0_1 or 0_2 is configured with Rel-16 PUSCH transmission scheme, the TDRA table corresponding to the DCI format (the DCI format 0_1 or the DCI format 0_2) configured with Rel-16 PUSCH transmission scheme is used. This can solve issues in the prior art, enable a UE to determine a TDRA table without additional radio resource control (RRC) signaling overhead, make the TDRA table align with a transmission scheme, provide a good communication performance, and/or provide high reliability.

Example

A UE derives a second PUSCH transmission scheme indication, wherein the second PUSCH transmission scheme indication is used to indicate that a target DCI format is not configured with Rel-16 PUSCH transmission scheme. The UE refuses to configure the target DCI format with Rel-16 PUSCH transmission scheme or determines a TDRA table corresponding to the target DCI format that is configured with Rel-15. If the TDRA table corresponding to the target DCI format is configured with Rel-15, the UE executes the PUSCH transmission in accordance with the determined TDRA table. It is noted that the target DCI format comprises: DCI format 0_1 and/or DCI format 0_2 in Rel 16. This can solve issues in the prior art, enable a UE to determine a TDRA table without additional radio resource control (RRC) signaling overhead, make the TDRA table align with a transmission scheme, provide a good communication performance, and/or provide high reliability.

Example (for the Initial Type 1 CG PUSCH Transmission with Rel-16 PUSCH Transmission Scheme)

A UE derives a third PUSCH transmission scheme indication, wherein the third PUSCH transmission scheme indication is used to indicate a TDRA table configured with Rel-16 PUSCH transmission scheme. The UE determines the TDRA table corresponding to a first target DCI format that is configured with Rel-16 PUSCH transmission scheme. The UE executes the PUSCH transmission in accordance with the determined TDRA table. Optionally, the first target DCI format comprises: DCI format 0_1. Optionally, a second target DCI format is configured with Rel-16 PUSCH transmission scheme. Optionally, the second target DCI format comprises: DCI format 0_2. Optionally, for the initial Type 1 CG PUSCH transmission configured with Rel-16 PUSCH transmission scheme, it is not expected that none of the DCI formats 0_1 and 0_2 is configured with Rel-16

PUSCH transmission scheme. Optionally, the third PUSCH transmission scheme indication is used to indicate that both the first target DCI format and the second target DCI format are able to configured with Rel-16 PUSCH transmission scheme. Optionally, for the initial type 1 CG PUSCH transmission with Rel-16 PUSCH transmission scheme, if both DCI formats 0_1 and 0_2 are configured with Rel-16 PUSCH transmission scheme, the TDRA table corresponding to DCI format 0_1 is used. This can solve issues in the prior art, enable a UE to determine a TDRA table without additional radio resource control (RRC) signaling overhead, make the TDRA table align with a transmission scheme, provide a good communication performance, and/or provide high reliability.

Example (for the Initial Type 1 CG PUSCH Transmission with Rel-16 PUSCH Transmission Scheme)

A UE derives a fourth PUSCH transmission scheme indication, wherein the fourth PUSCH transmission scheme indication is used to indicate a TDRA table configured with Rel-15 PUSCH transmission scheme. The UE determines the TDRA table corresponding to TDRA table configuration for UE specific search space (USS) in Rel-15. The UE executes the PUSCH transmission in accordance with the determined TDRA table. The TDRA table is configured in PUSCH-Config. Optionally, for the initial type 1 CG PUSCH transmission, if it is configured with Rel-15 PUSCH transmission scheme, the TDRA table can be used for USS in Rel-15. Optionally, the fourth PUSCH transmission scheme indication is used to indicate that a target DCI format is configured with Rel-15 PUSCH transmission scheme. This can solve issues in the prior art, enable a UE to determine a TDRA table without additional radio resource control (RRC) signaling overhead, make the TDRA table align with a transmission scheme, provide a good communication performance, and/or provide high reliability.

Some embodiments of the present disclosure provide technical solutions that enable a UE to determine the number of repetitions as flexible as possible. The following are some exemplary embodiments consistent with the disclosed methods for enabling the UE to determine the number of repetitions as flexible as possible.

Example (for the Initial Type 1 CG PUSCH Transmission with Rel-16 PUSCH Transmission Scheme)

A UE determine if a first parameter is configured in a TDRA table. If yes, the UE uses the first parameter to determine the number of PUSCH repetitions for the initial Type 1 CG PUSCH transmission. If not, the UE derive a second parameter via high signaling (such as higher layer signaling). Optionally, the first parameter comprises numberofrepetitions, t. Optionally, the second parameter includes repK. Optionally, the UE performs the repetitions according to the number of PUSCH repetitions. Optionally, the TDRA table is associated with time domain resource allocation in the high signaling. Note: For the initial Type 1 CG PUSCH transmission with PUSCH repetition, the number of repetitions is provided via numberofrepetitions if it is present in the corresponding TDRA table; otherwise, the number of repetitions is provided by repK. This can solve issues in the prior art, enable a UE to flexibly determine a number of repetitions, provide a good communication performance, and/or provide high reliability.

Example (for the Initial Type 2 CG PUSCH Transmission with Rel-16 PUSCH Transmission Scheme)

A UE determine if a first parameter is configured in a TDRA table. If yes, the UE uses the third parameter to derive an activation DCI and determine the number of PUSCH repetitions for the initial Type 2 CG PUSCH transmission. If not, the UE derive a second parameter via high signaling (such as higher layer signaling). Optionally, the first parameter comprises: numberofrepetitions, t. Optionally, the second parameter includes repK. Optionally, the UE performs the repetitions according to the number of PUSCH repetitions. Optionally, the TDRA table is associated with activation DCI for the Type 2 CG PUSCH transmission. Note: For the initial Type 2 CG PUSCH transmission with Rel-15 PUSCH transmission scheme or Rel-16 PUSCH transmission scheme or B, the number of repetitions is provided by the activation DCI via numberofrepetitions if it is present in the corresponding TDRA table; otherwise, the number of repetitions is provided by repK. This can solve issues in the prior art, enable a UE to flexibly determine a number of repetitions, provide a good communication performance, and/or provide high reliability.

In summary, some embodiments of the present application provide methods for enabling a UE to determine a TDRA table without additional RRC signaling overhead. Reusing PUSCH transmission scheme indication to select TDRA table also makes TDRA table align with PUSCH transmission scheme. Some embodiments of the present application also provide methods for enabling the UE to determine the number of repetitions as flexible as possible.

Commercial interests for some embodiments are as follows. 1. Solving issues in the prior art. 2. Enabling a UE to determine a TDRA table without additional radio resource control (RRC) signaling overhead. 3. Making the TDRA table align with a transmission scheme. 4. Enabling the UE to flexibly determine a number of repetitions. 5. Providing a good communication performance. 6. Providing a high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure propose technical mechanisms.

Figure 5:
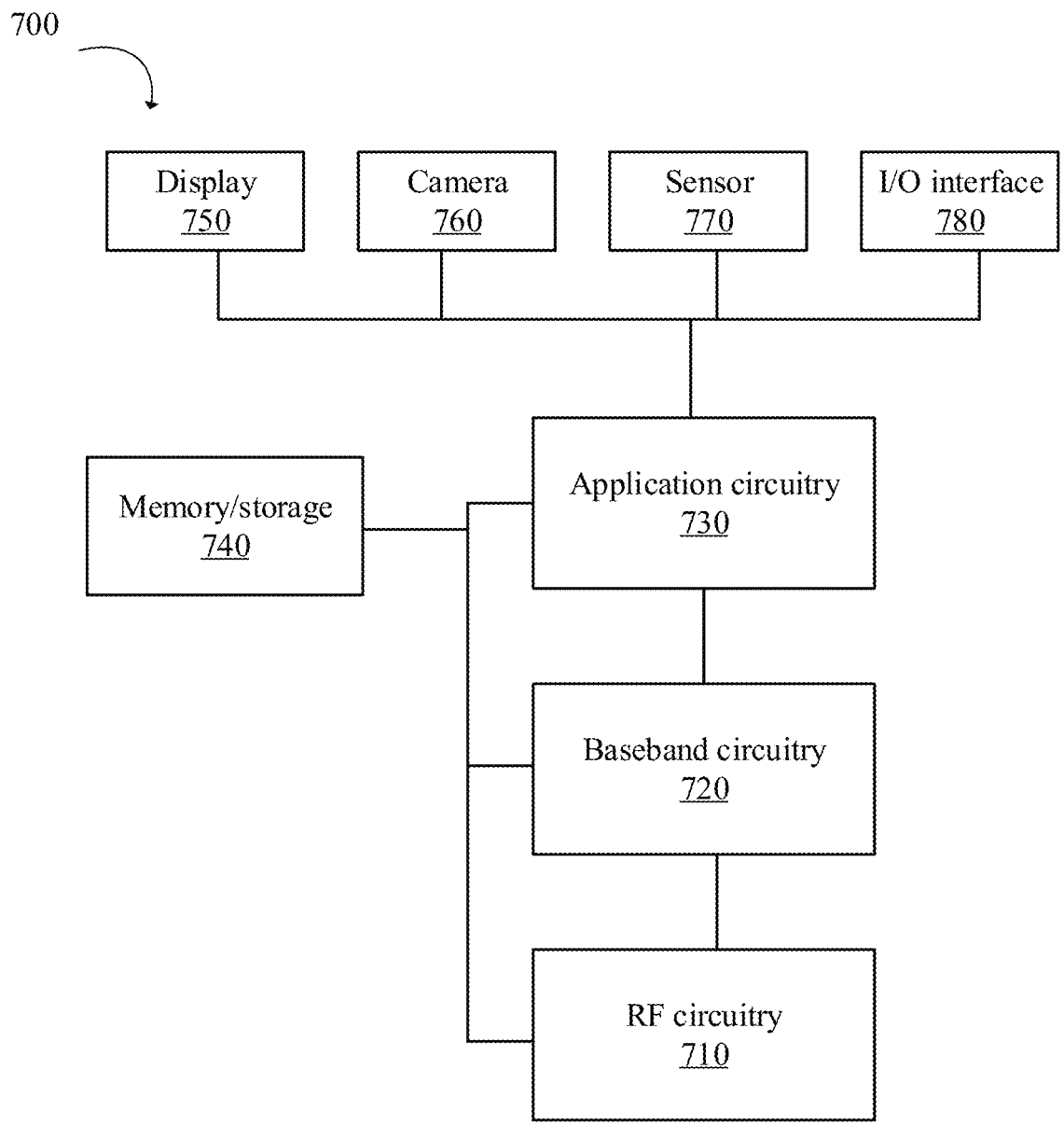
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
   deriving, by the UE, a transmission scheme indication, wherein the transmission scheme indication is used to indicate a time domain resource allocation (TDRA) table configured with a transmission scheme, wherein the transmission scheme indication comprises a physical uplink shared channel (PUSCH) transmission scheme indication, and the transmission scheme comprises a release 16 (Rel-16) PUSCH transmission scheme or a release 15 PUSCH transmission scheme; and
   determining, by the UE, the TDRA table in accordance with the transmission scheme indication; and
   executing, by the UE, a PUSCH transmission in accordance with the determined TDRA table, wherein the PUSCH transmission comprises an initial type 1 configured grant (CG) PUSCH transmission configured with the Rel-16 PUSCH transmission scheme or comprises an initial type 1 CG PUSCH transmission configured with the Rel-15 PUSCH transmission scheme, wherein the TDRA table corresponds to a target downlink control information (DCI) format configured with the Rel-16 PUSCH transmission scheme or corresponds to a TDRA table configuration for UE specific search space (USS) in Rel-15;
   wherein in a first case where the TDRA table corresponds to the target DCI format, the target DCI format comprises a DCI format 0_1 or a DCI format 0_2, and the initial type 1 CG PUSCH transmission is not expected that none of the DCI format 0_1 and the DCI format 0_2 is configured with the Rel-16 PUSCH transmission scheme;
   wherein in a second case where the TDRA table corresponds to the TDRA table configuration for USS in Rel-15, the TDRA table is configured in a parameter, the parameter comprises PUSCH-Config, and the TDRA table is used for the USS in the Rel-15.

2. The method of claim 1, wherein the UE determines if a first parameter is configured in the TDRA table; if yes, the UE uses the first parameter to determine a number of PUSCH repetitions; if not, the UE derives a second parameter to determine the number of PUSCH repetitions.

3. The method of claim 2, wherein the number of PUSCH repetitions is used for initial type 1 CG PUSCH transmission.

4. The method of claim 2, wherein the UE uses the first parameter to derive an activation DCI to determine the number of PUSCH repetitions, and the number of PUSCH repetitions is used for initial type 2 CG PUSCH transmission.

5. A wireless communication method by a user equipment (UE), comprising:
   determining, by the UE, if a first parameter is configured in a time domain resource allocation (TDRA) table; if yes, the UE uses the first parameter to determine a number of physical uplink shared channel (PUSCH) repetitions; if not, the UE derives a second parameter to determine the number of PUSCH repetitions;
   deriving, by the UE, a transmission scheme indication, wherein the transmission scheme indication is used to indicate the TDRA table configured with a transmission scheme;
   determining, by the UE, the TDRA table in accordance with the transmission scheme indication; and
   executing, by the UE, a PUSCH transmission in accordance with the determined TDRA table, wherein the transmission scheme indication comprises a PUSCH transmission scheme indication, and the transmission scheme comprises a release 16 (Rel-16) PUSCH transmission scheme or a release 15 PUSCH transmission scheme;
   wherein the TDRA table corresponds to a target DCI format configured with the Rel-16 PUSCH transmission scheme;
   wherein the target DCI format comprises a DCI format 0_1 or a DCI format 0_2;
   wherein only one of the DCI format 0_1 or the DCI format 0_2 is configured with the Rel-16 PUSCH transmission scheme;
   wherein the PUSCH transmission comprises an initial type 1 configured grant (CG) PUSCH transmission configured with the Rel-16 PUSCH transmission scheme, and the initial type 1 CG PUSCH transmission is not expected that none of the DCI format 0_1 and the DCI format 0_2 is configured with the Rel-16 PUSCH transmission scheme.

6. The method of claim 5, wherein the number of PUSCH repetitions is used for initial type 1 CG PUSCH transmission.

7. The method of claim 5, wherein the UE uses the first parameter to derive an activation downlink control information (DCI) to determine the number of PUSCH repetitions, and the number of PUSCH repetitions is used for initial type 2 CG PUSCH transmission.

8. The method of claim 5, wherein the TDRA table corresponds to a TDRA table configuration for UE specific search space (USS) in Rel-15,
   wherein the TDRA table is configured in a parameter;
   wherein the parameter comprises PUSCH-Config;
   wherein the PUSCH transmission comprises an initial type 1 CG PUSCH transmission configured with the Rel-15 PUSCH transmission scheme, and the TDRA table is used for the USS in the Rel-15.

9. A user equipment (UE), comprising:
a memory;
a transceiver; and
a processor coupled to the memory and the transceiver;
wherein the processor is configured to derive a transmission scheme indication, and the transmission scheme indication is used to indicate a time domain resource allocation (TDRA) table configured with a transmission scheme, wherein the processor is configured to determine the TDRA table in accordance with the transmission scheme indication; or
the processor is configured to determine if a first parameter is configured in a time domain resource allocation (TDRA) table; if yes, the processor uses the first parameter to determine a number of physical uplink shared channel (PUSCH) repetitions; if not, the processor derives a second parameter to determine the number of PUSCH repetitions;
wherein the processor executes a physical uplink shared channel (PUSCH) transmission in accordance with the determined TDRA table, wherein the transmission scheme indication comprises a PUSCH transmission scheme indication, and the transmission scheme comprises a release 16 (Rel-16) PUSCH transmission scheme or a release 15 PUSCH transmission scheme;
wherein the TDRA table corresponds to a target downlink control information (DCI) format configured with the Rel-16 PUSCH transmission scheme;
wherein the target DCI format comprises a DCI format 0_1 or a DCI format 0_2;
wherein only one of the DCI format 0_1 or the DCI format 0_2 is configured with the Rel-16 PUSCH transmission scheme;
wherein the PUSCH transmission comprises an initial type 1 configured grant (CG) PUSCH transmission configured with the Rel-16 PUSCH transmission scheme, and the initial type 1 CG PUSCH transmission is not expected that none of the DCI format 0_1 and the DCI format 0_2 is configured with the Rel-16 PUSCH transmission scheme.

10. The UE of claim 9, wherein the TDRA table corresponds to a TDRA table configuration for UE specific search space (USS) in Rel-15;
wherein the TDRA table is configured in a parameter;
wherein the parameter comprises PUSCH-Config;
wherein the PUSCH transmission comprises an initial type 1 CG PUSCH transmission configured with the Rel-15 PUSCH transmission scheme, and the TDRA table is used for the USS in the Rel-15.

11. The UE of claim 9, wherein the number of PUSCH repetitions is used for initial type 1 CG PUSCH transmission.

12. The UE of claim 9, wherein the processor uses the first parameter to derive an activation downlink control information (DCI) to determine the number of PUSCH repetitions, and the number of PUSCH repetitions is used for initial type 2 CG PUSCH transmission.

* * * * *